E. E. KOHL.
ANIMAL TRAP.
APPLICATION FILED SEPT. 1, 1920.

1,376,772.

Patented May 3, 1921.

WITNESSES

INVENTOR
E. E. Kohl,
BY
ATTORNEYS

UNITED STATES PATENT OFFICE.

EDMUND E. KOHL, OF SHERIDAN, WYOMING.

ANIMAL-TRAP.

1,376,772.  Specification of Letters Patent.  Patented May 3, 1921.

Application filed September 1, 1920. Serial No. 407,476.

*To all whom it may concern:*

Be it known that I, EDMUND E. KOHL, a citizen of the United States, and a resident of Sheridan, in the county of Sheridan and State of Wyoming, have invented certain new and useful Improvements in Animal-Traps, of which the following is a specification:—

The present invention relates in general to animal traps, and more particularly to an improved animal trap especially adapted for use in catching gophers.

The object of the invention is to provide a trap of this character of simple and durable construction, reliable and effective in operation and easy and inexpensive to manufacture.

Other objects and advantages of the invention reside in certain novel features of construction, combination and arrangement of parts which will be hereinafter more fully described and particularly pointed out in the appended claims, reference being had to the accompanying drawings, in which:

Figure 1:
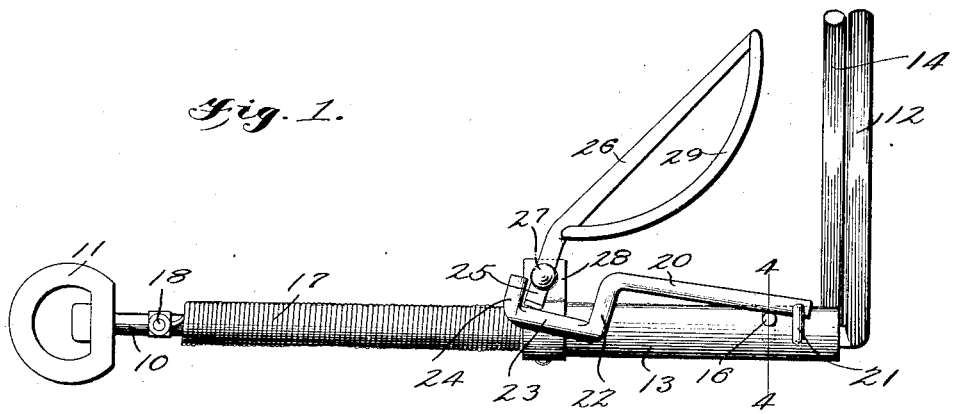
Figure 1 is a side elevational view of the trap set.
Figure 2:
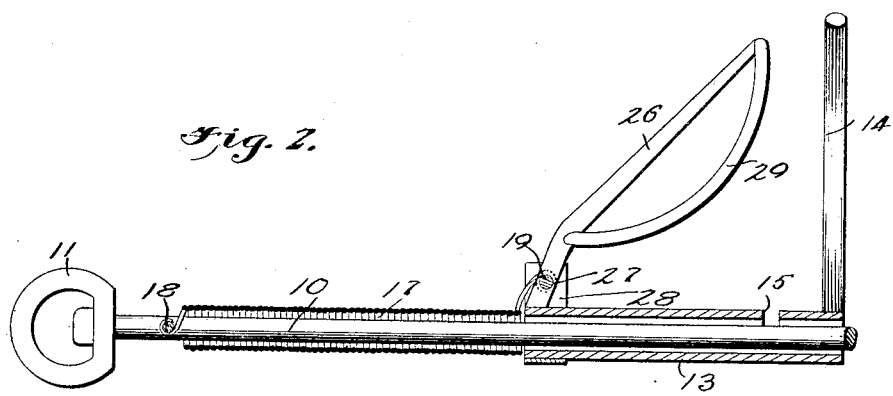
Fig. 2 is a longitudinal sectional view thereof, parts being shown in elevation for the sake of illustration.

Referring to the drawings, it will be seen the invention contemplates a gopher trap entirely of metallic construction, which is adapted to be placed at the mouth of the gopher hole or in any other desirable place. The gopher trap comprises a rotatable shaft 10 having an eye 11 at one end whereby the trap may be anchored in any conventional manner. The opposite end of the shaft carries a curved jaw 12 which is preferably formed integral with the metal of the shaft and is thereby constrained to partake of the motion of the shaft. A sleeve 13 is rotatably mounted on the shaft 10 at the end adjacent the jaw 12 and the sleeve carries a jaw 14 oppositely curved from the jaw 12 and adapted to coöperate with the jaw 12 in the trapping of the animals.

The sleeve 13 is provided adjacent the jaws with an arcuate slot 15 which extends circumferentially of the sleeve for approximately 180°.

A radial pin 16 is fixed to the shaft 10 and extends through and beyond the slot 15 of the sleeve. The pin 16 in the first place coöperates with the slot 15 of the sleeve to prevent longitudinal displacement of the sleeve and shaft and to limit the relative rotary movement of the sleeve with respect to the shaft, but has moreover another function which will hereinafter appear.

A torsional coil spring 17 is arranged upon the shaft 10 at the end thereof remote from the jaws. The end of the coil spring 17 adjacent the eye 11 is secured, as at 18, to the shaft 10 and the opposite end of the spring that is, the end adjacent the jaws, is secured as at 19, to the sleeve 13. The spring tends to rotate the sleeve and the shaft in opposite directions to throw the jaws forcibly toward and past each other.

Figure 3:
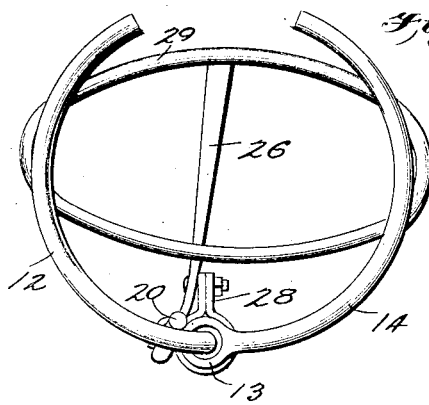
Fig. 3 is an end elevational view.
Figure 4:
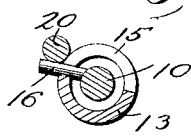
Fig. 4 is a transverse vertical section on line 4—4 of Fig. 1.
Figure 5:
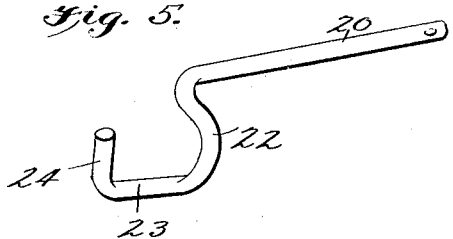
Fig. 5 is a detail perspective view of the lock bar.

Means is provided for releasably locking the jaws in set position as shown in Figs. 1 and 3. This means comprises a releasable locking bar 20 which has one end pivoted at 21 to the sleeve adjacent the jaws and between the jaws and the pin 16. The pivotal connection 21 is such that the bar in swinging away from the sleeve must swing slightly around about the same. The free end of the bar is offset, as shown at 22, extended outwardly, as shown at 23, and then upwardly, as shown at 24. The portions 22, 23 and 24 provide a seat with which a locking dog 25 of a trip 26 is adapted to coöperate. The trip 26 is pivoted, as at 27, to the bracket 28, which embraces and is secured to the sleeve 13. The pivot or fulcrum 27 of the trip and the dog is such that when the trip is engaged with the locking bar to retain the same in set position the locking dog is past its dead center so that the thrust of the locking bar only serves to more firmly engage the locking dog with its offset portion. The outer portion of the trip 26 with which the animal is adapted to contact is elliptical shaped, as indicated at 29, and is clearly shown in Fig. 3.

In operation it will be seen that the trap having been anchored in position by means of the eye 11, the jaws thereof are spread until the pin 16 abuts one end of the slot 15 of the sleeve. The locking bar 20 is then swung downwardly to the position shown in Fig. 1 where it abuts against the pin 16. The trip 26 is then swung to the position shown in Fig. 1 with its locking dog 25 engaging the portions 23 and 24 of the locking bar. The trip, locking dog and the locking bar being carried by the sleeve and the locking bar engaging the pin which is fixed to the shaft the parts are releasably locked against relative movement. However, as soon as the animal strikes the trip 26, the locking dog 25 thereof is swung about its pivot and past the dead center. The action of the coil spring 17 is then effective to throw the jaws 12 and 14 toward and past each other with considerable force, thereby crushing or strangling the animal.

I claim:

1. An animal trap of the character described, comprising a rotatable shaft, a jaw carried by one end of said shaft, a sleeve rotatably mounted on said shaft at one end, a jaw carried by said sleeve and adapted to coact with the jaw of said shaft, said sleeve having an arcuate slot extending circumferentially thereof, a radial pin carried by said shaft and projecting through and beyond the slot of said sleeve, a torsional coil spring arranged on said shaft and having one end secured thereto and its opposite end secured to said sleeve whereby to produce relative rotatable movement in said shaft and said sleeve, a releasably locking bar pivoted to said sleeve and engageable with the pin of said shaft, said locking bar having an offset at its free end and a trip pivoted to said sleeve and having a dog engageable with the offset of said locking bar whereby to releasably maintain the same in locked position.

2. An animal trap of the character described, comprising a rotatable shaft, a jaw carried by one end of said shaft, a sleeve rotatably mounted on said shaft at one end, a jaw carried by said sleeve and adapted to coact with the jaw of said shaft, a torsional coil spring mounted on said shaft and having one end secured thereto and its opposite end secured to said sleeve whereby to produce relatively rotatable movement in said shaft and said sleeve, a releasably locking bar pivoted to said sleeve, said locking bar having an offset at its free end and a trip pivoted to said sleeve and having a dog engageable with the offset of said locking bar whereby to releasably maintain the same in locked position.

3. An animal trap of the character described comprising a rotatable shaft, a jaw carried by one end of said shaft, a sleeve rotatably mounted on said shaft at one end, a jaw carried by said shaft and adapted to coact with the jaw of said shaft, said sleeve having a transverse slot extending circumferentially thereof, a pin carried by said shaft and projecting laterally through and beyond the slot of said sleeve, a torsional coil spring arranged on said shaft and having one end secured thereto and its opposite end secured to said sleeve, a releasable locking bar releasable with said sleeve and engageable with the pin of said shaft, and a trip pivoted to said sleeve and controlling said locking bar.

4. An animal trap of the character described, comprising a rotatable shaft, a jaw carried by one end of said shaft, a sleeve rotatably mounted on said shaft at one end, a jaw carried by said sleeve and adapted to coact with the jaw of said shaft, a torsional coil spring arranged on said shaft and having one end secured thereto and its opposite end secured to said sleeve whereby to induce relative rotary movement in opposite directions of said shaft and said sleeve, a releasable locking bar pivoted to said sleeve and adapted to constrain said sleeve and said shaft against relative rotary movement, and a trip secured to said sleeve and controlling said locking bar.

5. An animal trap of the character described comprising a rotatable shaft, a jaw carried by one end of said shaft, a rotatable sleeve mounted on said shaft at one end, a jaw carried by said sleeve and adapted to coact with the jaw of said shaft, a torsional coil spring arranged on said shaft and having one end secured thereto and its opposite end secured to said sleeve whereby to induce relative rotary motion in opposite directions of said shaft and said sleeve, a locking bar pivoted to said sleeve and adapted to constrain said sleeve and said shaft against relative rotary movement, a bracket rigidly secured to said sleeve and a trip pivoted to said bracket and having a dog engageable with said locking bar, said dog being positioned past the dead center of its fulcrum when operatively engaged with said locking bar.

6. An animal trap of the character described comprising a rotatable shaft, a jaw carried by one end of said shaft, a sleeve rotatably mounted on said shaft at one end, a jaw carried by said sleeve and adapted to coact with the jaw of said shaft, said sleeve having a transverse slot extending circumferentially thereof, a radial pin carried by said shaft and extending through said slot, and a torsional coil spring arranged on said shaft and having one end secured thereto and its opposite end secured to said sleeve whereby to produce rotary motion in opposite directions of said shaft and said sleeve.

7. An animal trap of the character described comprising a rotatable shaft, a jaw carried by one end of said shaft, a sleeve rotatably mounted on said shaft at one end, a jaw carried by said sleeve and adapted to coact with the jaw of said shaft, and a torsional coil spring arranged on said shaft and having one end secured thereto and its opposite end secured to said sleeve whereby to produce rotary motion in opposite directions of said shaft and said sleeve.

8. A gopher trap comprising coacting jaws, a shaft carrying one of said jaws, a sleeve mounted on said shaft and carrying the other of said jaws, and means inducing relative rotary motion of said sleeve and said shaft whereby said jaws are forced toward and past each other.

9. A gopher trap comprising coacting jaws, a shaft, a sleeve and means actuating the shaft and sleeve relatively for operating said jaws.

EDMUND E. KOHL.